Patented Aug. 22, 1944

2,356,127

UNITED STATES PATENT OFFICE 2,356,127

LUBRICANT

Robert M. Thomas, Union, and William J. Sparks, Cranford, N. J., assignors to Jasco, Incorporated, a corporation of Louisiana No Drawing. Application December 29, 1937, Serial No. 182,252

5 Claims. (Cl. 252—59)

This invention relates to a mineral oil lubricant containing a high molecular weight, tough, elastic product prepared by co-polymerization of di-olefines and hydrocarbon aliphatic olefines.

Various attempts have been made in the past to prepare co-polymers from these raw materials, such as by heating them to a temperature above 50° C., preferably in the presence of aromatic compounds, but various difficulties have attended these prior art processes and products made heretofore have not had any of the properties considered desirable for purposes of the present invention. Butadiene has been polymerized in the presence of isobutylene and metallic sodium, but results only in a series of compounds which may be represented by the general formula

$C_4H_8(C_4H_6)_{n-1}$, with n double bonds per molecule where n is the number of $C_4$ groups in the compound. These compounds are produced by the addition of one molecule of isobutylene at the end of the polymer of butadiene. In other words, apparently the butadiene polymerization proceeds until an isobutylene group is attached and then the butadiene polymerization stops; therefore, it is clear that in this type of process apparently the sole function of the isobutylene is to arrest the polymerization of the butadiene, thereby preventing the formation of any very high molecular weight product, and even if such high molecular weight products should be formed, they would have substantially the same properties as polymers of butadiene alone.

It is one object of the present invention to provide a new and efficient method of carrying out the desired co-polymerization by using reaction conditions substantially different than ever used heretofore for reacting these raw materials. It is another object of the invention to produce products having both new and improved properties resulting from the novel method of manufacturing.

Broadly the invention consists in reacting a low molecular weight olefine, preferably an iso-olefine, such as isobutylene, with a low molecular weight di-olefine, preferably a conjugated di-olefine, such as butadiene, at relatively low temperature, namely, below 0° C. and preferably below —50° C., in the presence of a suitable catalyst, such as aluminum chloride dissolved in ethyl chloride. The reaction is advantageously carried out in the presence of liquefied ethylene or other solvent for the reactants.

Instead of isobutylene, other iso-olefines capable of polymerizing in a manner similar to the isobutylene may be used, such as 2-methyl butene-1, etc. Generally it is desirable to use such iso-olefines having not more than about 7 carbon atoms. Although it is preferred to use such iso-olefines on account of their particular adaptability for polymerizing to extremely high molecular weight polymers, it is possible to use other readily polymerizable low molecular weight olefines, such as propylene or alpha or beta butylene.

As the di-olefine reactant, instead of using butadiene, other compounds, such as isoprene, cyclo pentadiene and the like, may be used. Although it is much easier to control the course of the reaction and the nature and the quality of the product when substantially pure, individual olefines and di-olefines are used as raw materials, yet, under many circumstances, it will be found more economical to use mixtures of either or both of these materials separately or together and either alone or in admixture with other substantially inert hydrocarbon compounds, such as those of the paraffin series, e. g. methane, propane, butanes, pentanes, and the like. Also crude mixtures of these various compounds may be used, such as a petroleum refinery $C_4$ cut separated from the products obtained by cracking higher molecular weight hydrocarbons. Such a cut will generally contain a substantial amount of butadiene, as well as a considerably larger proportion, as much as 10% or 15%, of isobutylene and still larger amounts, e. g. 20% to 30%, of normal butylenes. Such a crude cut may be treated with the catalyst directly if desired or one or more of the several types of reactants may be separated from the crude $C_4$ cut by suitable methods, such as fractionation, selective absorption by suitable solvents, e. g. dilute acid and subsequent regeneration of the olefine from the alkyl sulfate, etc., and then recombined in the desired proportions. As a still further modification, the $C_4$ cut may be used as the sole source of supply for the olefines and may be further fortified by addition of further amounts of di-olefines, such as butadiene, isoprene, etc.

As the catalyst, instead of using aluminum chloride, other solutions of Friedel-Crafts metal halides having a similar catalytic influence on polymerization and condensation reactions may be used, as, for instance, aluminum bromide, titanium tetrachloride, and the like, or solutions of these catalysts with organic compounds, such as ethyl chloride. Other compounds which may be used as solvent for the catalysts include methyl chloride, isopropyl chloride, chloroform, sulfuryl chloride ($SO_2Cl_2$), carbon disulphide, etc.

In preparing the preferred type of catalyst, such as the $AlCl_3$-$C_2H_5Cl$, it is best to dissolve the aluminum chloride in ethyl chloride at room temperature because it is relatively insoluble at the operating temperatures, e. g. below —50° C. as shown by the solubility data in the table here below:

*Solubility of aluminum chloride in ethyl chloride*

| Sample | Temp., °C. | Contact time, min. | Percent AlCl₃ dissolved |
|---|---|---|---|
| Ethyl chloride and excess aluminum chloride | —78 | 60 | <0.1 |
| Do | —45 | 45 | <0.1 |
| Do | 0 | 180 | 4.4 |
| Do | +8 | 60 | 5.4 |
| Do | +12 | 180 | 7.4 |

After a substantial amount of aluminum chloride has been dissolved in desired amount up to the saturation point, the solution, if not already of the proper concentration, may be adjusted by dilution with further solvent and then cooled down to the desired temperature for the catalytic co-polymerization. Inasmuch as the catalyst does not precipitate out of the ethyl chloride at low temperature, even though plain AlCl₃ has a very low solubility in ethyl chloride at such temperatures, it is believed that, when aluminum chloride is dissolved in ethyl chloride, some sort of reaction takes place in producing the catalyst, and the latter is a substantially different compound than simple aluminum chloride. If desired, the AlCl₃·C₂H₅Cl, either separated as such or else dissolved in ethyl chloride, may be dissolved in or diluted with other solvents or diluents, such as methyl chloride, chloroform, etc.

In carrying out the co-polymerization, one suitable procedure is to mix the olefine and di-olefine in the desired proportions, either alone or with a suitable solvent diluent or refrigerant, such as liquefied ethylene, and then add the catalyst, such as a 5% solution of aluminum chloride in ethyl chloride, either alone or dissolved in a suitable diluent, such as liquefied ethylene. The use of liquefied ethylene for the several purposes mentioned has an additional advantage that it serves simultaneously as refrigerant to maintain the desired low temperature by absorption of the heat of evaporation by boiling of some of the liquefied ethylene. If desired, the cooling may be effected by either internal or external cooling coils through which a suitable refrigerating liquid is passed or by having the reacting liquids fed into a pipe, coil, or other condenser immersed in a suitable refrigerated bath. However, instead of using such a vaporizable diluent or solvent, dry ice (solidified carbon dioxide) may be used as refrigerant merely by adding pieces of it to the reaction vessel. Owing to the desirability of maintaining a low temperature, it is preferred to have the catalyst, as well as the reactants, precooled to a temperature at least as low as the desired operating temperature. If dry ice is used as refrigerant, the operating temperature is about —78° C., whereas if liquefied ethylene is used as refrigerant an operating temperature of about —95° C. is maintained (ethylene alone boils at —103° C.). It is possible to use even lower temperatures by using liquefied methane or mixtures thereof with other hydrocarbons.

If desired, the reaction may be carried out under pressure, either just sufficiently above atmospheric to keep the reactant and solvent in the liquid phase or considerably higher pressures may be used, such as up to 10, 20 or 50 atmospheres or more.

Although it is obvious that the proportions of the various raw materials to be used may vary over fairly wide limits without departing from the scope of the invention, it is generally preferred to use less than 60% by weight and preferably even less than 30%, e. g. 10% or 20%, of the di-olefine based on the total weight of olefine and di-olefine.

Further details of the procedure and advantages of the invention may be noted from the following examples which are given for the sake of illustration only and without intention to limit the invention thereto. From the data shown herewith, it will be apparent that the operating conditions may be varied at will in order to obtain a wide variety of products having substantially different properties useful for various purposes, although not all products would be useful for any one particular purpose. For example, by increasing the proportion of isobutylene, the pliability of the product may be increased and if the proportion of isobutylene is sufficiently high, the product may be given greater elasticity, although this latter property is also greatly affected by the temperature of operation. Low temperatures of reaction give relatively non-tacky products. When the proportion of butadiene in the reaction mixture is increased, a greater dryness is obtained and if carried too far the tensile strength of the product may be adversely affected. Generally, it is preferred to use between about 5% and 20% of butadiene and 95% to 80% of isobutylene by weight and it is preferred to operate at extremely low temperatures, —95° C. having given better results than —78° C.

The product of the present invention has another distinct advantage over simple polymerized iso-olefines or polymerized di-olefines in that the former cannot be vulcanized in the ordinary sense of the term and the latter, although they can be vulcanized, they cannot be made to have a desired degree of vulcanization, hardness, toughness, elasticity, etc., and yet be relatively saturated with respect to hydrogen and are consequently fairly readily susceptible to oxidation and attack by acids, bases, and other chemicals. The present products can be vulcanized and when so treated they are converted into products having a desired combination of hardness, pliability, toughness, elasticity, etc. and at the same time become substantially more resistant to oxidation and attack by strong acids, etc. than are vulcanized di-olefines of similar texture. The vulcanization is preferably carried out at a relatively low temperature, e. g. between about 100° and 150° C., preferably about 120° or 130° C., or at such a temperature at which a relatively long time, e. g. 4 or 5 hours or more, is required to effect the vulcanization. In other words, it is better to use a low temperature, long time vulcanization than to use a high temperature, short time vulcanization.

The vulcanized co-polymers are of great value for electrical cable coatings, impregnated or surface coated cloth, leather, floor coverings, acid-resistant linings, gasket materials, mechanical goods, belting and sheeting, automobile tires, valves and accessories, such as motor supports, windshield stripping or vibration dampener. Furthermore, the co-polymers may be produced in a sponge-like form and employed for thermal insulation or shock-absorbing material. The product may be chlorinated and compounded with rubber, resins, inert fillers, e. g. carbon black, zinc oxide, wax, etc., solvents and plasticizers with or without subsequent vulcanization.

Some experimental data are given in Table I.

which has no rubber-like properties and cannot be vulcanized to a rubber-like product.

Table I

|  | 1 | 2 | 3 | 4 |
|---|---|---|---|---|
| Isobutylene_____cubic centimeters_ | 90_____ | 50_____ | 90_____ | 120. |
| Butadiene_____do___ | 10_____ | 50_____ | 10_____ | 30. |
| Ethylene [1]_____do___ | 100_____ | 100_____ | Dry ice__ | 150. |
| Ethylene [2]_____ | 25_____ | 25_____ |          | 150. |
| AlCl₃-ethyl ch. (5% comp. in EtCl)_____ | 2-3_____ | 2-3_____ | 2-3_____ | Several cc. |
| Temp_____°C__ | −95_____ | −95_____ | −78_____ | −95. |
| Product: |  |  |  |  |
|   Texture_____ | Sl. tacky_ | More tacky than 1_ | More tacky than 1_ |  |
|   Color_____ | Water white |  |  | Water white. |
|   Rubber-like_____ | Yes_____ | Yes_____ | Yes_____ | Yes. |
|   Remarks_____ |  | Similar to 1_ | Similar to 1 but lower mol. wt. |  |

[1] Added together with the butadiene.
[2] Added together with the aluminum chloride-ethyl chloride.

In the above table, the product shown in Example 1 is somewhat superior for most purposes to the products of the other examples given, as it shows less tackiness, although all of these products may be satisfactorily used by subjecting them to a subsequent vulcanization as will be discussed more fully under Examples 5 and 6. If desired, the texture of these various products may be substantially modified by mixing therewith before, during, or after co-polymerization, a substantial amount of mineral fillers, pigments, etc., such as pulverized clays, limestone dust, pulverized silica, diatomaceous earth, iron oxide, sulfur, carbon black, accelerators, etc. These materials may be used either in small amounts, such as $\frac{1}{10}$% to 1% or so, or in sufficiently large amounts, e. g. 5% to 20% or 30% or more, to effect a major change in the "body" of the co-polymer. Also, if a co-polymer product of substantial hardness is prepared, it may be desirable to incorporate therewith a substantial amount of a plasticizer or softener, such as paraffin wax, petrolatum, viscous mineral lubricating oil or a small amount of a relatively non-volatile organic compound, such as di-butyl phthalate. Also, other substances may be added, such as dyes, anti-oxidants, etc. These various materials may be either mixed in during the course of co-polymerization or may be mixed in by milling into the polymerized product, either at ordinary or somewhat elevated temperatures and either alone or in the presence of suitable solvent or softening agent.

The products made according to the present invention are generally soluble in mineral oils if the proportion of di-olefine used is less than about 15% and are very useful as a thickener for lubricating oils as will be shown more in detail in Example 7. They are in general less soluble in a common organic solvent, such as chloroform, carbon disulfide, and naphtha than is a poly-isobutylene having a similar molecular weight. The vulcanized product is fairly stable against ultra-violet light and sunlight and does not tend to substantially decrease in molecular weight when exposed thereto and in this respect is substantially superior to plain high molecular weight poly-isobutylene and poly-diolefine because the latter is not homogenous and cannot be made to act as a single pure compound, but always is susceptible to separation of the several constituents when subjected to various conditions, such as solution in solvents, attack by acids, etc.

When butadiene is polymerized alone (without isobutylene) under conditions such as those used in Examples 1-4, a white powder is obtained

Example 5

75 parts by weight of the co-polymer produced in Example 4 were milled together in a rubber mill with 5 parts of magnesium oxide, 2 parts of sulfur and one part of hexamethylenetetramine and the compound product was heated for 2 to 3 hours in a press at 160° C. to 180° C. and then removed to an oven at 110° C. for 48 hours. The resulting product was generally changed in character but was not fully vulcanized, as it did not have an elastic limit. Another sample of this compounded co-polymer product was treated for 15 minutes with sulfur mono-chloride ($S_2Cl_2$) at room temperature and then removed to an oven at 120° C. for 20 minutes and also found to be very tough, had a definite limit of elasticity and was fully vulcanized. These results show that the co-polymer containing 20% of butadiene can be vulcanized although requiring more drastic vulcanization conditions than rubber or polymerized butadiene. If desired, the co-polymer may be broken down some by milling prior to compounding with the filler and vulcanization accelerator, etc.

The following data show that vulcanization has substantially improved the strength of the co-polymer:

Poly-isobutylene (150,000 m. w.) sheet:
    2 mm. thick and 1″ wide placed in tensile strength machine. Carried 1200 gm. and kept stretching throughout test.

Vulcanized co-polymer:
    1.2 mm. thick and 1″ wide by same method of testing carried 2500 gm.+(limit of testing is 2500 gm.).

Example 6

A co-polymer of the type used in Example 5 containing 20% of butadiene was compounded as follows:

| | |
|---|---|
| Co-polymer | 100 |
| Zinc oxide | 10 |
| Sulfur | 3 |
| Stearic acid | 3 |
| Zimate | 1 |
| Captax | 0.5 |
| Carbon black | 25 |
| Total | 142.5 |

This composition was cured for 5 hours at 130° C. After vulcanization, the product showed a tensile strength (Scott) of 1560# with an elongation of 1100%. It had good elasticity and fair retractability. The vulcanized sheet differed from neoprene in being more resistant to benzene and ethylene dichloride. It was also more resistant to acids, such as $H_2SO_4$ or $HNO_3$ than either neoprene or vulcanized rubber.

Example 7

A sample of the co-polymer product made as shown in Example 2 was dissolved in a refined mineral lubricating oil and compared with a similar solution made with an equivalent amount of poly-isobutylene of about 15,000 molecular weight in the same oil. Tests on viscosity and viscosity index gave the following data:

| Oil sample | Vis./100 | Vis./200 | V. I. |
|---|---|---|---|
| 1-oil | 275 | 45.9 | 13 |
| 2-oil+2% poly-isobutylene | 658 | 70.6 | 93 |
| 3-oil+2% co-polymer | 705 | 75.0 | 99 |

It is obvious that the co-polymer tested is an efficient lubricating oil thickener and a viscosity index improver.

It is not intended that the invention be limited to the specific examples which are given merely for the sake of illustration, nor to any theories given as to the mechanism of the operation of the invention, but only by the appended claims in which it is intended to claim all novelty inherent in the invention as broadly as the prior art permits.

We claim:

1. A composition comprising a mineral hydrocarbon oil containing dissolved therein a substantial portion of a high molecular weight substantially solid soft, rubbery, plastic, elastic, sulfur reactive, hydrocarbon co-polymer of a low molecular weight isoolefine with a low molecular weight di-olefine, said co-polymer being adapted to increase the viscosity and viscosity index of the mineral oil in which it is dissolved.

2. In the process of preparing a lubricant containing solid copolymers produced by reacting together a low molecular weight isoolefin with a low molecular weight conjugated diolefin in the presence of a dissolved metal halide catalyst at a temperature below $-50°$ C. to produce a high molecular weight, soft, solid, rubbery, plastic, elastic, surfur reactive hydrocarbon copolymer, the step of compounding the solid copolymer in a hydrocarbon oil to increase the viscosity and viscosity index.

3. A lubricant comprising a mineral hydrocarbon and a synthetic thickener dissolved therein comprising a soft, plastic, rubbery, elastic, high molecular weight sulfur reactive hydrocarbon copolymer of isobutylene and a diolefin for raising both the viscosity and the viscosity index of the mineral hydrocarbon.

4. A lubricant composition comprising in combination a mineral hydrocarbon having a normal viscosity at 100° in the neighborhood of 275, and dissolved therein a synthetic thickener comprising an interpolymer of isobutylene with a substantial amount of a diolefin, less than about 15%, the said interpolymer being characterized by solubility in hydrocarbons, reactivity with sulfur, and being a soft, rubbery, plastic, elastic, high molecular weight substance.

5. In the process of preparing a lubricant containing solid copolymers produced by reacting together a major proportion of an aliphatic isoolefin having 4 to 7, inclusive, carbon atoms per molecule with a minor proportion of an aliphatic conjugated diolefin having 4 to 5, inclusive, carbon atoms per molecule, at a temperature between 0° C. and $-160°$ C. in the presence of a polymerization catalyst comprising a Friedel-Crafts catalyst dissolved in a solvent which forms no complex with the Friedel-Crafts catalyst and is liquid at the reaction temperature to produce a high molecular weight, soft, solid, rubbery, plastic, sulfur reactive hydrocarbon polymer, the step of compounding the solid copolymer into a hydrocarbon oil.

ROBERT M. THOMAS.
WILLIAM J. SPARKS.